May 26, 1970   J. W. TITUS   3,514,778
DRIVE SYSTEM FOR SCANNING ANTENNA
Filed Oct. 29, 1965   2 Sheets-Sheet 1

INVENTOR
JAMES W. TITUS

BY
ATTORNEY

May 26, 1970        J. W. TITUS        3,514,778

DRIVE SYSTEM FOR SCANNING ANTENNA

Filed Oct. 29, 1965        2 Sheets-Sheet 2

INVENTOR
JAMES W. TITUS

BY

ATTORNEY

United States Patent Office 3,514,778
Patented May 26, 1970

3,514,778
DRIVE SYSTEM FOR SCANNING ANTENNA
James W. Titus, Riverview, Md., assignor to the United States of America as represented by the Secretary of the Navy
Filed Oct. 29, 1965, Ser. No. 505,769
Int. Cl. H01q 1/28
U.S. Cl. 343—705                        7 Claims The present invention relates to a zero-reactive torque motor and more particularly to a unique stator-rotor arrangement which minimizes reactive torque whereby the effects of inertia are prevented. This invention has significant applications in space satellites, although not limited thereto, where undesirable rotating torques are encountered.

A common problem in hand tools, appliances, and devices which utilize electrical motors is the introduction of reactive torque caused by operation of the motor. Although in many instances this reactive torque is not a problem of paramount importance, it is desirable to either minimize or virtually eliminate this reactive torque. In other applications, this reactive torque is a most significant problem, the elimination of which is essential. One such application is in the field of satellite equipment and instrumentation.

The equipment required to control space vehicles, as well as obtain important technical data while in actual flight, often requires the use of various types of torque producing devices, such as rotating and scanning antennas within the vehicle. The effects of these torques on the satellite may cause undesired deviations in the flight pattern of the space vehicle.

Heretofore it has been the general practice to employ additional counter-torques within the satellite so as to produce a corrective influence on the vehicle when experiencing an undesired torque. Such counter-torque devices may take the form of electrically operated servo-driven gyroscopes which are controlled in such a manner as to apply equal but opposite torques to the space satellite for a given magnitude of undesired torques, thereby cancelling out the effects of said undesired torques.

A disadvantage to the above approach to flight control becomes readily apparent when it is noted that a prime objective in the design of space vehicles is the conservation or reduction of space, weight and energy requirements of the various component parts, because, in so doing, smaller satellite boosters and/or added space laboratory equipment may be used in a given satellite. Hence, the elimination of extra equipment, for example, electrically powered corrective gyros previously mentioned, or other such similarly operated devices reduces the space, weight, and power requirements of the space vehicle.

The general purpose of this invention is to provide a unique stator-rotor arrangement in a drive motor whereby the effects of torque are prevented rather than cancelled out. To attain this, the invention contemplates the arrangement of rotatably bearing-mounting the stator of a servo-type torque motor within its housing so that both the stator and the rotor, which is also bearing mounted, rotate freely in opposite directions and independently of the housing or carriage within which the motor is mounted. Power to drive the motor is supplied through slip-rings and when current flows through the motor, equal and opposite torques are applied to rotor and stator, causing each of them to accelerate in opposite directions at rates inversely proportional to their respective inertias. Since the stator is free to turn, there is no torque reaction upon the carriage within which the motor is housed, except the bearing friction and slip-ring drag. However, since the rotor and stator rotate in opposite directions, the two sources of bearing friction will virtually cancel each other, thereby providing zero reactive torque.

An object of the present invention is to provide a rotatably mounted stator and rotor in torque motor to virtually eliminate reactive torque.

Another object of the invention is the provision in a torque motor of a rotatably mounted stator and rotor arrangement which are spring biased relative to each other whereby the energy required for reversal of the motor is greatly reduced in a scanning cycle.

Still another object of the present invention is the provision of a novel scanning antenna drive system for use in a space satellite whereby space, weight and energy are conserved.

Another essential object of the invention is to provide a scanning antenna drive system whereby the effects of inertia are prevented rather than cancelled.

A further object of the invention is to provide a scanning drive system whereby the effects of stator-rotor bearing friction cancel out, thus reducing reactive torques caused thereby.

Yet another object of the invention is to provide a motor drive system whereby the stator and rotor are both rotatably mounted relative to the support structure, so as to utilize a minimum number of bearings, thereby reducing friction while providing the necessary support.

Figure 1:
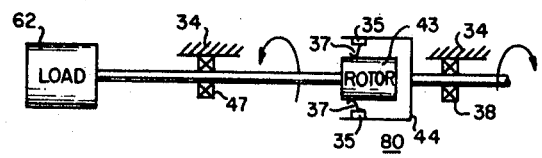
FIG. 1 shows a schematic of the invention its most basic form.

Referring now to the drawings in which like components in FIGS. 1 through 4 have been designated by the same reference numerals and particularly to FIG. 1, there is illustrated a general illustration of the basic concept of the invention. Rotor 43 of torque motor 80 is rotatably mounted on ball bearing 47 for relative motion with respect to a motor carriage or support structure 34. Similarly stator 44, adjacent rotor 43, is rotatably mounted on bearing 38 relative to support structure 34. A load 62 to be driven is attached to rotor 43. Load 62 may be the driven element of any hand tool or appliance, such, for example, as drill bits, beaters or the like, or rotatable antennas in antenna scanning systems. When current is applied in the usual manner to brush rings 35, a rotational torque is caused on both stator 44 and rotor 43 in accordance with general principles of motor action. Since both stator and rotor are freely rotatable, they will accelerate in opposite directions at a rate inversely proportional to their inertias. Thus load 62 is rotated relative to support 34 without the effects of reverse-torque thereon. If it is desired, as is the case in the specific embodiments of the device discussed in connection with FIGS. 3 and 4, to have load 62 turn in an oscillatory manner, current applied to the motor 80 is reversed at any given instant, thus causing a reversal in the direction of said motor.

Figure 2:
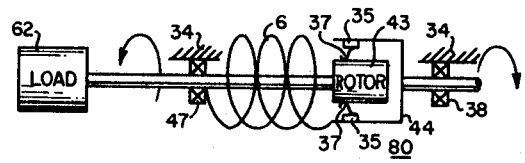
FIG. 2 shows a modification of the basic form of FIG. 1.

Turning now to FIG. 2 where a modification of the basic embodiment of FIG. 1 is shown, it can be seen that the same elements are present in addition to a tuned spring means 6 connecting the stator 44 to the rotor 43. The purpose of this spring is to greatly reduce the amount of power necesary to cause the motor 80 to reverse itself and load 62 at the beginning of a reversal period. This is accomplished by chosing a spring of predetermined stiffness so as to resonate at the operating scan frequency of the motor 80, much like the hair spring in a watch, thereby reducing considerably the power required to drive motor 80 through an operating cycle. Also, as previously discussed, reactive torques acting on support structure 34 are virtually eliminated except for brush ring drag and bearing friction, the latter of which is also substantially eliminated because of the opposite relative motion of the rotor and stator.

Figure 3:
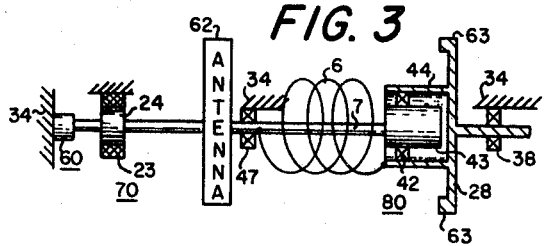
FIG. 3 shows a basic schematic diagram of the invention utilized to drive a satellite antenna from which other structural embodiments may be derived for such purpose without departing from the spirit and scope of the invention.

Turning now to FIG. 3 where a basic schematic illustration of a particular embodiment of the invention for antenna drive purpose is shown, the output shaft of bias torque motor 60 is connected to the rotor 24 of the synchro 70, the former of which is mounted on housing or support structure 34 which could be attached to or form part of a satellite structure. Connected to the rotor of a synchro 70 is the antenna 62 and the rotor 43, the latter of which is adjacent stator 44. Relative rotation between the base 34, rotor 43 and stator 44 is achieved by bearings 38, 42 and 47 which provide the necessary rigidity or support between adjacent elements. Torsion spring 6 connects the stator 44 and rotor 43 of main motor 80. Supplementary inertia elements 63 are connected to stator 44 by arms 28 and provide the stator with the necessary inertia relative to the antenna-rotor, to limit the relative excursions between stator 44 and rotor 43 to a small magnitude.

In operation, the system of FIG. 3 will function as follows: main motor 80, comprising stator 44 and rotor 43, is energized in any conventional manner (not shown) at the beginning of a scanning operation so as to develop a oscillating torque, thereby causing relative motion in accordance with old and well-known principles of motor action. An oscillatory scanning motion will occur at the frequency of the torque developed by the motor. The stiffness of spring 6 and the magnitude of the supplementary inertia 63 are designed so that, together with the antenna, they will form a vibrating system having a natural resonant frequency tuned to the desired scanning frequency. This arrangement reduces to a large degree the magnitude of the motor torque required to sustain a scan of the desired amplitude and frequency. Although the drive system is designed with the stator-rotor bearings positioned so as to cancel out a substantial amount of the friction therefrom, some residual friction due to slipring drag, etc., will exist. Hence, if the system for the above-mentioned reasons has an otherwise constant scan period or frequency, this friction will cause an error in the positioning of the antenna, which if allowed to remain would be cumulative from cycle to cycle. The use of a bias torque motor 60 together with a servo-amplifier contained in a feedback control system, the details of which are not disclosed since they form no part of the instant invention, operates to cancel the effects of such friction at each cycle, thus rendering the system accurate within the necessary range for operation. Synchro 70, one of many types of angle transducers suitable for use in this device, transmits the antenna position electrically for use in the aforesaid feedback control system and to an information system for readout using well known techniques. Since the antenna oscillates to the right and left of a null position or reference position, for example, ±30° to scan a 60° search area, the synchro 70 may be used to sense and correct any drift or deviation from the reference position. The bias torque motor 60 functions to establish the initial reference position for the antenna and may, in response to a command signal, establish a new reference position or direction about which the antenna will scan in an oscillating manner. Thus a compact antenna drive assembly together with auxilliary motors necessary to provide a complete radar scanning system is formed using a minimum of space and designed to operate with optimum efficiency.

Figure 4:
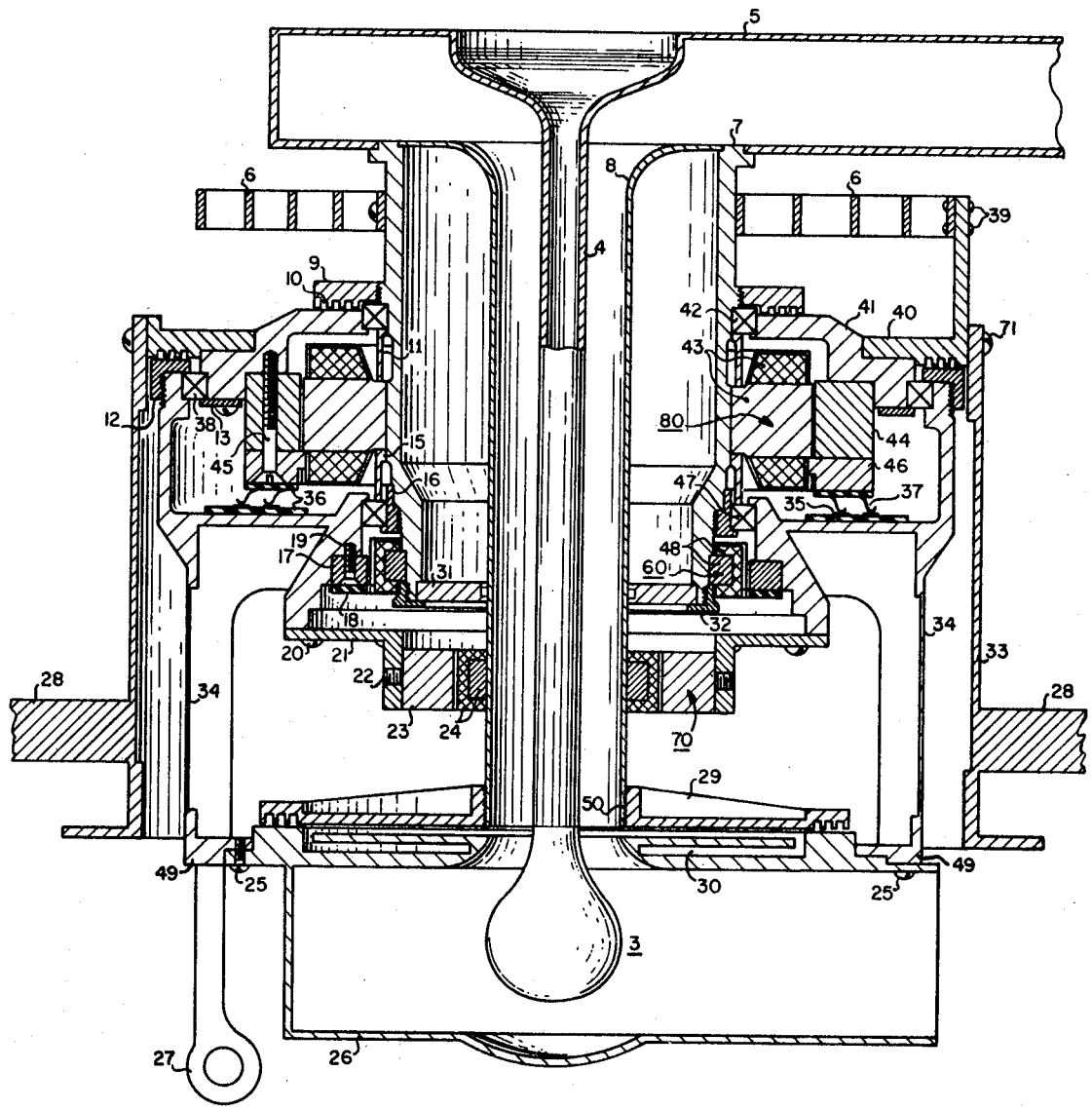
FIG. 4 shows a plan view of a preferred structural embodiment of the invention for satellite antenna-drive application.

Turning now to FIG. 4 which illustrates a complete structural embodiment of the basic system of FIG. 3, there is shown an inner cylindrical housing or shaft 7 which supports the upper end of a wave guide 5 and main motor rotor 43 of a motor indicated generally at 80. Fixedly mounted within shaft 7 for rotation therewith is the outer conductor 8 of a co-axial rotary joint of which inner conductor 4 is a part, the remainder of the co-axial rotary joint being defined by a pancake choke joint indicated generally as 3. The waveguide 5 is connected to energize an antenna (not shown) secured thereto in any conventional manner.

The lower end 50 of outer conductor 8 is threaded for receiving the lower seal ring 29 which is correspondingly threaded. Member 29 also serves as the upper section of the pancake choke joint 3, whose lower section is formed by wave guide section 26 having a choke joint cavity area 30, and which is fixedly mounted to the annular flange 49 of cylindrical base member 34 by guide mounting screws 25. Also mounted toward the lower end of outer conductor 8 is synchro 70 defined by synchro rotor 24 and stator 23.

Shaft 7 is carried by upper and lower annular ball bearing means 42 and 47, respectively, with both the bearings and rotor 43 retained in their axial location by bearing nut 16 and spacer sleeves 11 and 15, respectively. Bearing nut 16 forces sleeve 15 against rotor 43, which in turn forces sleeve 11 against the inner race of bearing 42. Groves 10 is seal ring 9 serve to prevent the escape of lubricant from bearing 42. Similarly serving grooves are shown in seal ring 29 and 40.

Bias torque rotor 48 is held on shaft 7 by threaded clamp nut 32, which also retains spacer ring 31 in a counterbore at the end of shaft 7. Spacer ring 31 provides support to the outer conductor 8 of the coaxial portion of the wave guide rotary joint. Also securely affixed on shaft 7 at its upper end is one end of torsion spring 6, the other end of the spring being secured to seal member 40 of stator housing 41.

Mounting bracket 27 is provided for attaching the unit to a satellite in a conventional manner. Mounted at the midsection of cylindrical base 34 are rotor 48 and stator 17 of a bias torque motor 60. Retaining screw 19 secures stator 17 to base member 34. Brush ring 18 is assembled on stator 17 in accordance with usual manufacturers' techniques. One end of synchro bracket 21 connects to a synchro stator 23 while the other end connects to the base 34 and is fastened to each by screws 22 and 20, respectively. Slip ring mountings 36 and slip ring 35 for main motor 80 are also mounted on base 34, with slip ring 35 making electrical contact with main brushes 37.

With reference now to the outer housing 33 of the complete assembly, supplementary inertia arms 28 are located at its lower end and act to increase the inertia of the main stator and thus limit the relative acceleration between rotor and a stator. Outer seal ring 40 serves as an extension to stator housing 41 and supports spring 6 and housing 33, spring 6 being secured by screws 39. The grooves in seal 40, together with the upper surface of lock nut 12, provide a conventional labyrinth seal. Housing 33 is affixed to rotate with housing 41 by means of screw 71 or by welding thereto. Housing 41 is supported by outer bearing 38 and functions to support main stator 44 and upper bearing 42. Mounting screw 45 serves to secure both the main stator 44 and brush block 46 to housing 41, brush block 46 supporting main brushes 37. Outer bearing 38 permits relative motion between outer housing assembly 33, etc., and base 34, and is retained in position by clamp ring 13 on its lower side and lock nut 12 on its upper side.

From the foregoing, it is apparent that the invention provides a torque motor which has virtually zero reaction and which has innumerable applications in hand tools, appliances, and the like. It is also apparent that the invention enables the attainment of a unique radar scanning antenna drive system for use in a space satellite which minimizes the effects of inertia on the satellite itself, while also reducing the size, weight and power requirement of older systems, all of which are important considerations in the design of space satellites for use in space exploration.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A reversible motor having negligible reactive torque comprising:
   support housing means,
   a rotor rotatably mounted on said support means,
   a stator disposed in operative relation to said rotor,
   means rotatably mounting said stator relative to said support means,
   conductive means for supplying operating potential to said motor, and
   means for biasing said rotor and stator relative to each other so as to minimize the energy required to reverse the direction of said motor.

2. The motor defined in claim 1, wherein said biasing means is a spring tuned to the operating frequency of said reversible motor.

3. The motor of claim 1 in combination with a load connected to be cyclically driven by said motor.

4. The combination of claim 3 wherein:
   said biasing means is a spring tuned to the operating frequency of said cycle so as to minimize the energy required to reverse direction of said motor,
   said conductive means includes slip-rings mounted on the rotor and stator of said motor, and
   said means rotatably mounting said stator is a ball bearing.

5. The combination of claim 4 wherein:
   said support housing means is mounted fixedly in a satellite,
   said load is a scanning antenna with shaft means connecting said scanning antenna to said motor.

6. The combination of claim 5, further including:
   a second motor mounted on said shaft means so as to correct the error in the position of the load due to friction and slip-ring drag in said motors, and
   an angle transducer connected to the first mentioned motor by said shaft means for continuously indicating the position of said load.

7. The combination defined in claim 6, wherein said shaft means is an annular cylindrical body having the rotors of said first mentioned motor and said second motors mounted thereon.

References Cited

UNITED STATES PATENTS

| | | | |
|---|---|---|---|
| 2,524,361 | 10/1950 | Sawyer | 318—539 |
| 2,740,060 | 3/1956 | Cooper | 318—539 |
| 2,784,330 | 3/1957 | Banning | 318—539 |
| 3,125,888 | 3/1964 | Fox et al. | 343—766 |
| 3,341,151 | 9/1967 | Kampinsky | 343—705 |

ELI LIEBERMAN, Primary Examiner

U.S. Cl. X.R.

318—539; 343—760, 766